US005390060A

United States Patent [19]
Pecha et al.

[11] Patent Number: 5,390,060
[45] Date of Patent: Feb. 14, 1995

[54] LOCK MECHANISM FOR RESTRAINING A HEAD OF A HEAD/ARM ASSEMBLY

[75] Inventors: John J. Pecha, Edina; Mark A. Toffle, St. Louis Park, both of Minn.

[73] Assignee: Seagate Technology, Inc., Scotts Valley, Calif.

[21] Appl. No.: 204,654

[22] Filed: Mar. 2, 1994

Related U.S. Application Data

[60] Division of Ser. No. 53,953, Apr. 19, 1993, Pat. No. 5,323,284, which is a continuation of Ser. No. 664,202, Mar. 4, 1991, abandoned.

[51] Int. Cl.⁶ ............................................. G11B 5/54
[52] U.S. Cl. ................................................... 360/105
[58] Field of Search ........................................ 360/105

[56] References Cited

U.S. PATENT DOCUMENTS

| | | | |
|---|---|---|---|
| 3,786,457 | 1/1974 | Kahn | 360/104 |
| 4,644,429 | 2/1987 | Boe | 360/105 |
| 4,716,478 | 12/1987 | Walsh et al. | 360/104 |
| 4,851,943 | 7/1989 | Perry | 360/105 |
| 4,893,205 | 1/1990 | Hoppe et al. | 360/104 |
| 4,943,875 | 7/1990 | Reidenbach et al. | 360/104 |
| 5,023,737 | 6/1991 | Yaeger | 360/105 |

Primary Examiner—A. J. Heinz
Attorney, Agent, or Firm—Kinney & Lange

[57] ABSTRACT

A lock mechanism for restraining a head of a head/arm assembly is disclosed. The head/arm assembly has a rigid arm and flexible support means supporting the head and mounted to the rigid arm. The flexible support means normally biases the head to an operating position. The lock mechanism comprises a lock arm having a length, the lock arm arranged to move parallel with the length of the lock arm between a first lock arm position wherein a forward edge of the lock arm engages the flexible support means to restrain the flexible support means from biasing the head to its operating position and a second lock arm position wherein the lock arm is free of the flexible support means. Actuator means moves the lock arm parallel with the length of the lock arm between the first and second lock arm position.

3 Claims, 5 Drawing Sheets

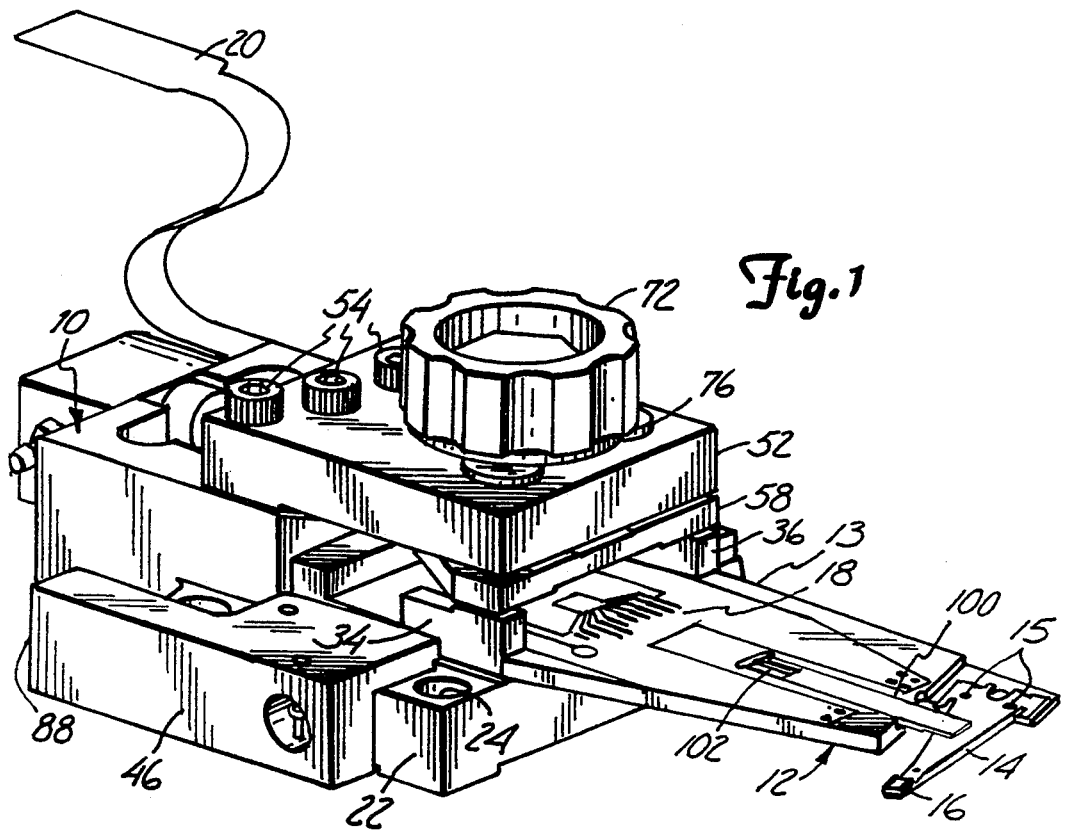
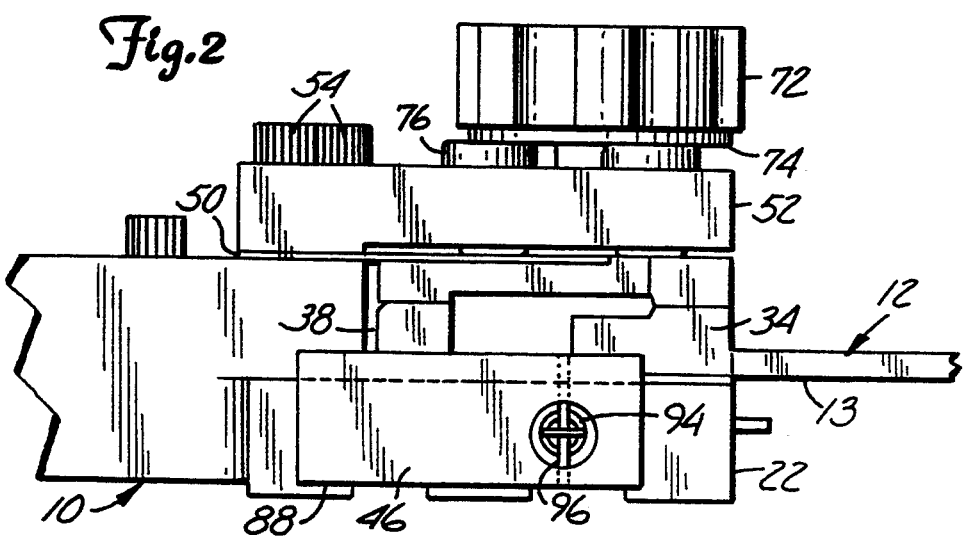
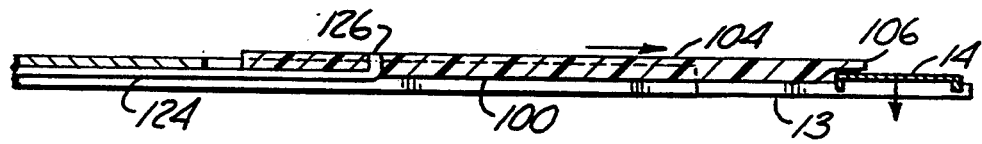

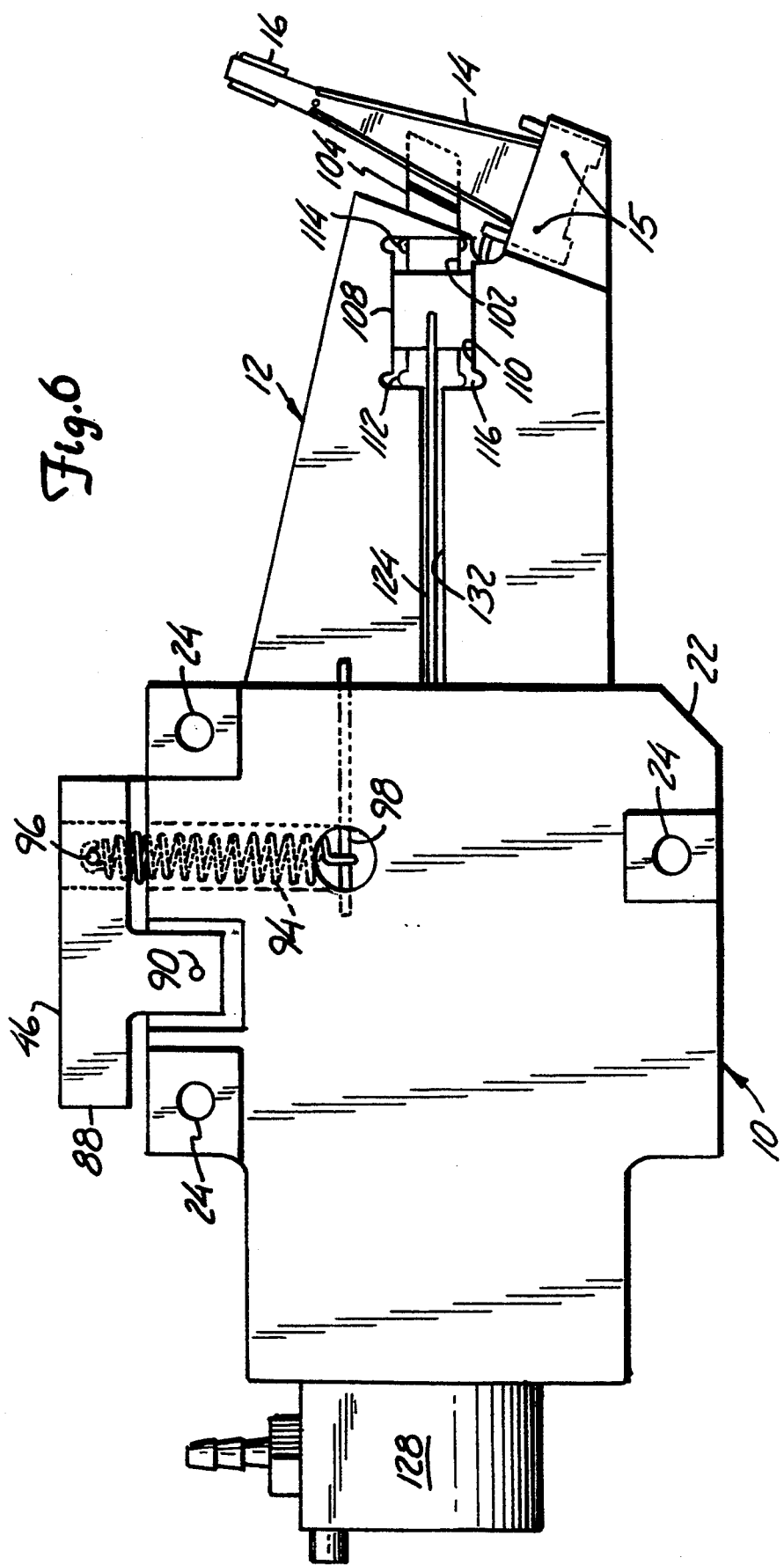

LOCK MECHANISM FOR RESTRAINING A HEAD OF A HEAD/ARM ASSEMBLY

This is a divisional of application Ser. No. 08/053,953, filed Apr. 26, 1993 now U.S. Pat. No. 5,323,284 which is a continuation of application Ser. No. 07/664,202 filed Mar. 4, 1991 abandoned. Priority of the prior applications is claimed pursuant to 35 USC § 120.

BACKGROUND OF THE INVENTION

This invention relates to magnetic head/arm assemblies, and particularly to block receivers for supporting magnetic head/arm assemblies to the movable or actuator arms of magnetic disc drives.

Magnetic disc drives include a movable arm supporting one or more magnetic head/arm assemblies and arranged to move the head/arm assemblies between radial positions to read and/or write data to and from various tracks of a rotating disc media. The data may comprise digital information, including clock or servo information. A head/arm assembly usually includes a magnetic transducing head fixed to a gimbal spring, which in turn is fixed to a flex arm, which in turn is fixed to a rigid arm. The movable or actuator arm assembly of the disc drive includes a receiver block fixed to the movable arm and arranged to receive the head/arm assembly. The arrangement is such as to move the head radially adjacent the disc surface with linear or rotational movement of the movable arm.

The receiver block on the movable arm usually includes adjustment screws to adjust the position of the fixed arm of the head/arm assembly, and thus align the magnetic head in respect of the movable arm. In the past, it has been necessary to realign and readjust the head position when replacing or changing the head/arm assembly. Consequently, each time a head has been removed for cleaning purposes and the like, it was necessary to realign the head upon reassembly to the movable arm. This was time consuming and led to alignment errors. Thus, prior disc drives provided no effective way to self-align the head upon reassembly to the movable arm.

Magnetic heads are arranged to "fly" above the disc surface while the disc is rotating. Particularly, the flex arm urges the head toward the disc. The aerodynamic characteristics of the head and its associated slider, together with the gimbal support, cause the head to fly as the disc rotates. When disc rotation halts, the head "lands" onto the disc surface. some disc drives provide a mechanical lock mechanism to physically lift and lock the head from the disc surface when the head is in a rest position. Such lock mechanisms are useful for arresting head movement to prevent damage to the head during storage or shipment of the drive, or when the head is removed for cleaning and/or replacement. Prior lock mechanisms were mounted to the disc drive chassis and arranged to engage the head/arm assembly (such as the flex arm) when the head was at a rest position, such as at an outside track of the disc. The head could be physically lifted from the nonrotating media only when the head was at its assigned rest position, such as at the outside track. Prior drives had no effective mechanism to remove and/or lock the head when in any position relative to the disc.

SUMMARY OF THE INVENTION

The present invention is directed to a receiver block assembly for receiving a head/arm assembly. The receiver assembly includes a base member adapted to be fixed to the movable arm of the disc drive, and includes a receiving surface for receiving at least a portion of the rigid arm of the head/arm assembly. Positioning means on the base member positions the head/arm assembly, and a clamp clamps the rigid arm of the head/arm assembly to the base member.

The head/arm assembly, including the flex arm and any head preamplifiers, is packaged so that it is received by the receiver assembly and biased against predetermined positioning pins to accurately position the head in respect to the movable arm. In particular, a receiver block assembly is provided for releasably mounting a head/arm assembly to a movable arm of a disc drive. The head/arm assembly has a rigid arm having at least two mutually exclusive predetermined defined edges and a flex arm mounted to the rigid arm supporting the transducing head in a predetermined relation to the predetermined edges of the rigid arm. The receiver assembly includes a base member having a surface receiving the rigid arm of the head/arm assembly. At least two positioning pins are mounted to the base member adjacent the receiving surface, and an actuator provides a predetermined bias against the rigid arm so that the defined edges of the rigid arm bear against the positioning pins. A clamp assembly is mounted to the base member to releasably clamp the rigid arm of the head/arm assembly to the receiving surface of the base. The base member is fixedly mountable to the movable arm of the disc drive to position the positioning pins in a predetermined relation to the arm. With the head/arm assembly positioned in the block assembly and the block assembly mounted to the movable arm, the head is in a predetermined position with respect to the movable arm.

One feature of the present invention resides in the provision of a head lock mechanism associated with the arm operable to restrain the head regardless of the radial position of the head with respect to the disc. In particular, a blade member is supported by the rigid arm of the head/arm assembly and is movable between a first position wherein the blade engages the flex arm of the head/arm assembly to restrain the flex arm from biasing the head to its operating position, and a second position wherein said blade is free of the flex arm. An actuator moves the blade between its first and second positions.

Another feature of the present invention resides in the provision of sized head/arm assemblies so that several head/arm assemblies may be stacked in a receiver block assembly for operation with plural discs, as a disc pack.

BRIEF DESCRIPTION OF THE DRAWINGS

FIG. 1 is a perspective view of a receiver block assembly in accordance with the presently preferred embodiment of the present invention having a head/arm assembly mounted thereto;

FIG. 2 is an enlarged side view of a portion of the receiver and head/arm assembly shown in FIG. 1;

FIG. 6 is a bottom view of the apparatus illustrated in FIG. 1; and

FIG. 7 is a section view of a head lifting and lock mechanism employed in the apparatus illustrated in FIGS. 1-6.

DETAILED DESCRIPTION OF THE PREFERRED EMBODIMENTS

Figure 3:
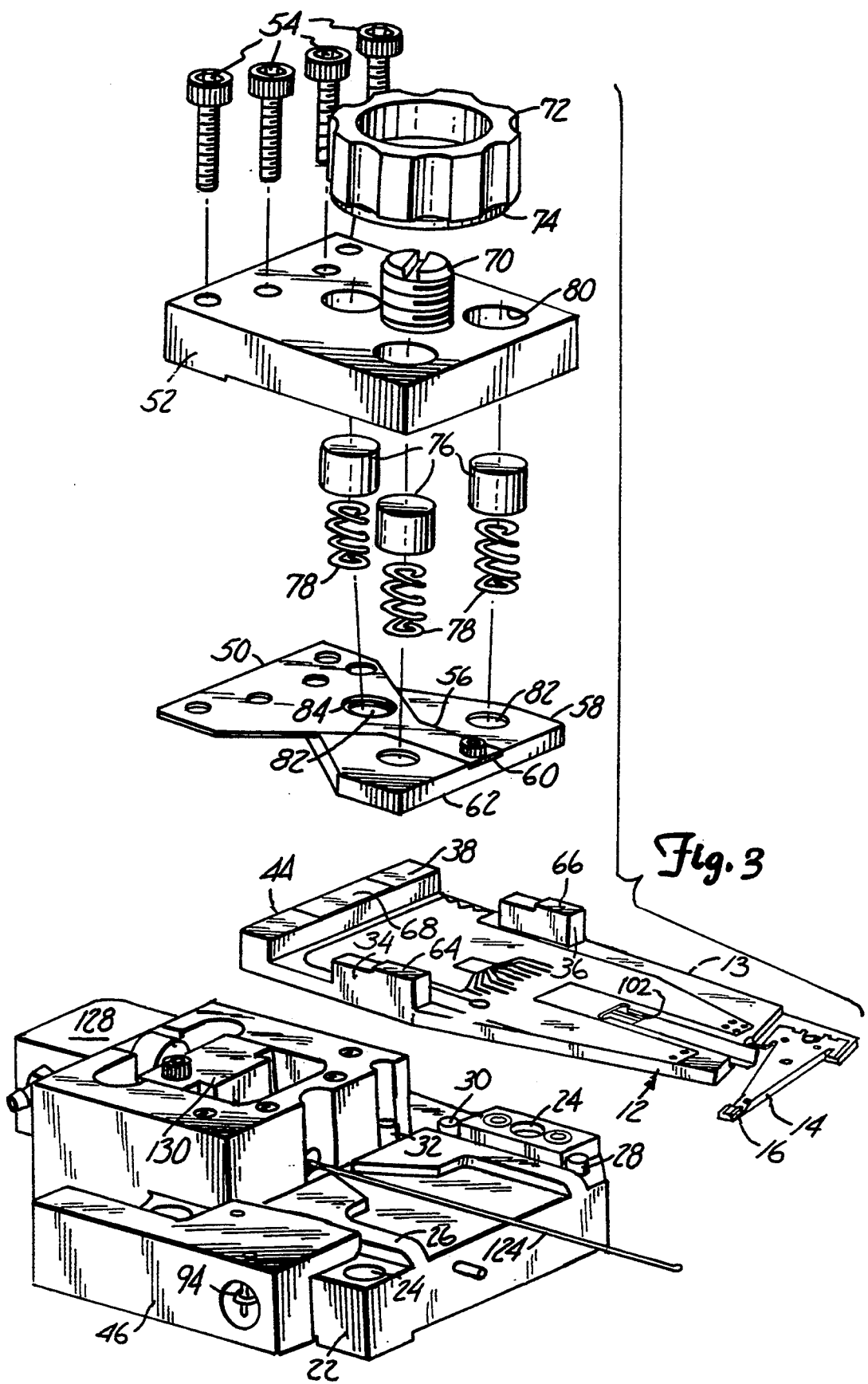
FIG. 3 is a perspective view of the receiver and head/arm assembly shown in FIG. 1, exploded vertically.

FIGS. 1 through 6 taken together, illustrate a receiver block assembly 10 in accordance with the preferred embodiment of the present invention, having a head/arm assembly 12 mounted thereto. As will be more fully understood hereinafter, a plurality of such head/arm assemblies may be mounted for simultaneous operation in connection with plural discs of a disc stack. For sake of simplicity, only one head/arm assembly is illustrated in the drawings and will be described in detail.

The present invention will be described in connection with a servo head for writing and reading servo data to and from the servo tracks of a magnetic disc media for a disc drive. The principles of the invention can be applied to data heads for reading and/or writing data from or to a disc. As a servo head, the head/arm assembly is ordinarily oriented adjacent the side of the disc opposite the data heads.

As shown in FIGS. 1-6, head/arm assembly 12 is mounted to receiver assembly 10, the head/arm assembly including a flex arm or floating arm 14 rigidly fastened by fasteners 15 to a rigid arm 13 constructed of rigid material such as aluminum. It is preferred to orient the flex arm as shown in the drawings to match the orientation of the corresponding data heads (not shown) to that the flex arm is oriented about 20° to the track tangent (about 70° to the length of rigid arm 13). A magnetic transducing head 16 (which may be mounted to a gimbal spring, not shown) is mounted to flex arm 14. Head/arm assembly 12 also carries a printed circuit 18, which may comprise the preamplifiers for the read circuits, which in turn is electrically connected to head 16 and by flexible cable 20 to the read or other circuits of the disc drive. In prior drives, the head/arm assembly was mounted directly to the receiver of the movable actuator arm mechanism of the drive, such as by mounting and alignment screws fastening rigid arm 13 to the movable arm. The present invention provides the receiver block assembly 10 to releasably support the head assembly in a predetermined orientation, the receiver assembly being mounted to the movable actuator arm (not shown).

Receiver assembly 10 includes a rigid base 22 constructed of aluminum having apertures 24 through which mounting screws may mount the receiver assembly to the movable arm (not shown) of a disc drive for movement therewith. A receiver surface 26 (FIG. 3) is formed in the upper surface of base 22 and for receiving head/arm assembly 12. A pair of positioning pins 28 and 30 are located at one side of surface 26 and positioning pin 32 is located at the rearward end of the surface.

Figure 5:
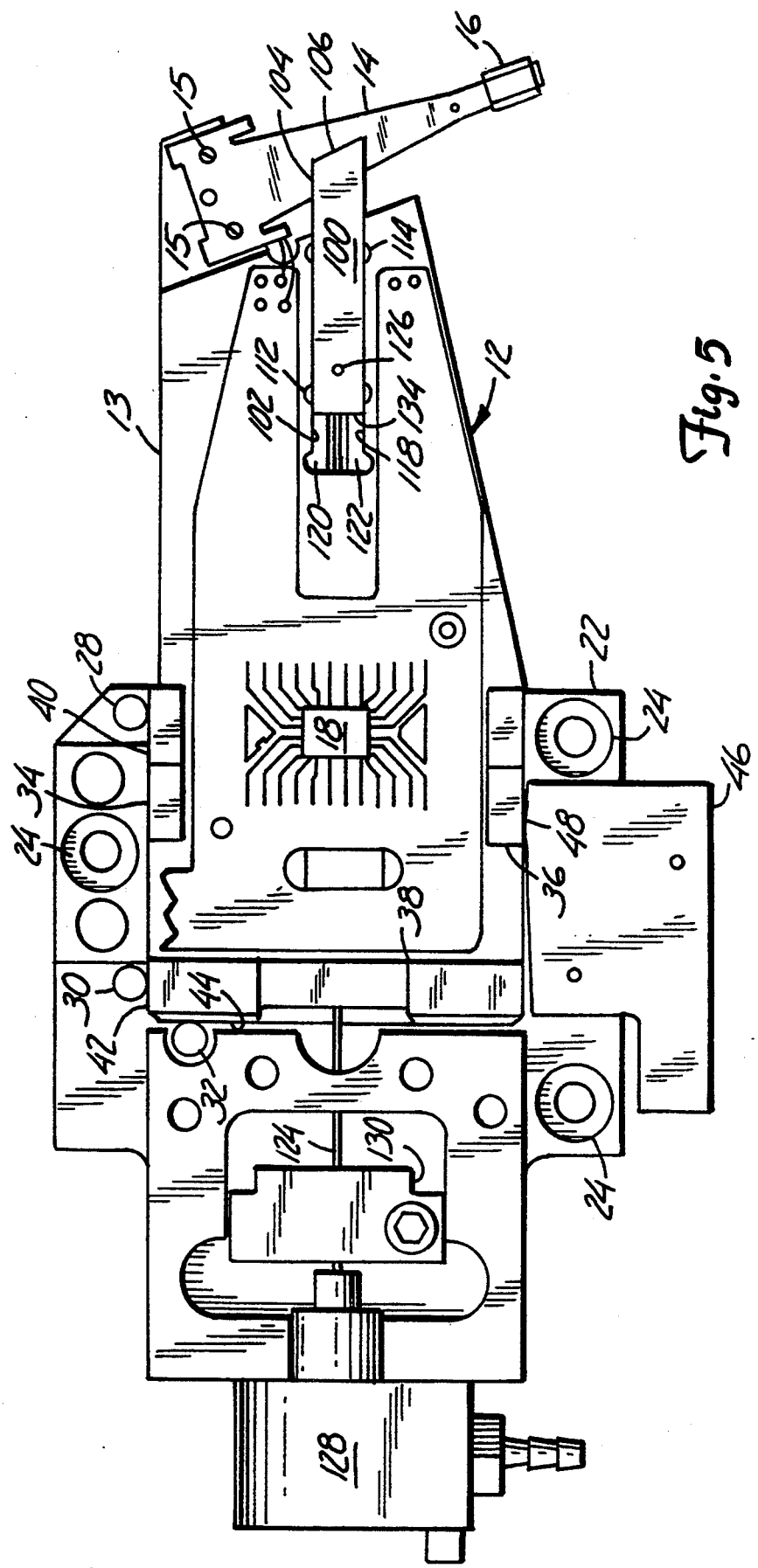
FIG. 5 is a top view of the apparatus illustrated in FIG. 1 with a portion removed.

As shown particularly in FIGS. 3 and 5, rigid arm 13 of the head/arm assembly includes shoulders 34, 36 and 38. The side surfaces 40 and 42 of shoulders 36 and 38 are coplanar and arranged to bear against pins 28 and 30, respectively, of base 22. Surface 44 of shoulder 38 is arranged to bear against pin 32. As will be explained, a spring biased manually operable actuator 46 is arranged to bear against surface 48 of shoulder 34 to bias head/arm assembly 12 so that the surfaces 40, 42 and 44 bear against pins 28, 30 and 32, respectively. Also, as will be more fully explained, when biased to the described position, head 16 of head/arm assembly 12 is accurately positioned in respect to receiver assembly 10, and hence the movable arm to which the receiver is mounted.

As shown particularly in FIG. 3, metal flex spring 50 is arranged to be sandwiched between base 22 and aluminum cap 52. Cap 52 is fixedly mounted to base 22 by mounting screws 54. Spring 50 includes an arm 56 arranged to suspend rigid aluminum operator 58 in a cantilevered position over the region of receiver surface 26 in base 22. Operator 58 is mounted by fastener 60 at the outboard end of arm 56 and includes a bottom surface 62 arranged to abut top surfaces 64, 66 and 68 of shoulders 34, 36 and 38.

Threaded fastener 70 is mounted to the upper side of cap 32 to receive threaded knob 72. Knob 72 carries a washer 74 arranged to bear against the caps 76 of compression springs 78. Conveniently, springs 78 and their caps 76 extend through apertures 80 in cap 52, and are received in recesses 82 in operator 58. Apertures 84 may be provided in spring 50, as required, to permit one or more of the springs 78 to bear against operator 58.

It will be appreciated that cap 52 is fixedly positioned in respect of base 22 of receiver assembly 10 so that compression springs 78 bear against operator 58 to in turn bear against shoulders 34, 36 and 38 of arm 13 of the head/arm assembly, thereby clamping head/arm assembly 12 in position to the base of receiver assembly 10. Tightening knob 72 and washer 74 against compression springs 78 imparts greater clamping force against operator 58, and hence against rigid arm 13 of the head/arm assembly, to retain the head/arm assembly in place in the receiver. Thus, when rigid arm 13 of the head/arm assembly is positioned against positioning pins 28, 30 and 32 and biased to that position by actuator 46, the head/arm assembly is fixed in place by the clamping action achieved by tightening knob 72.

Figure 4:
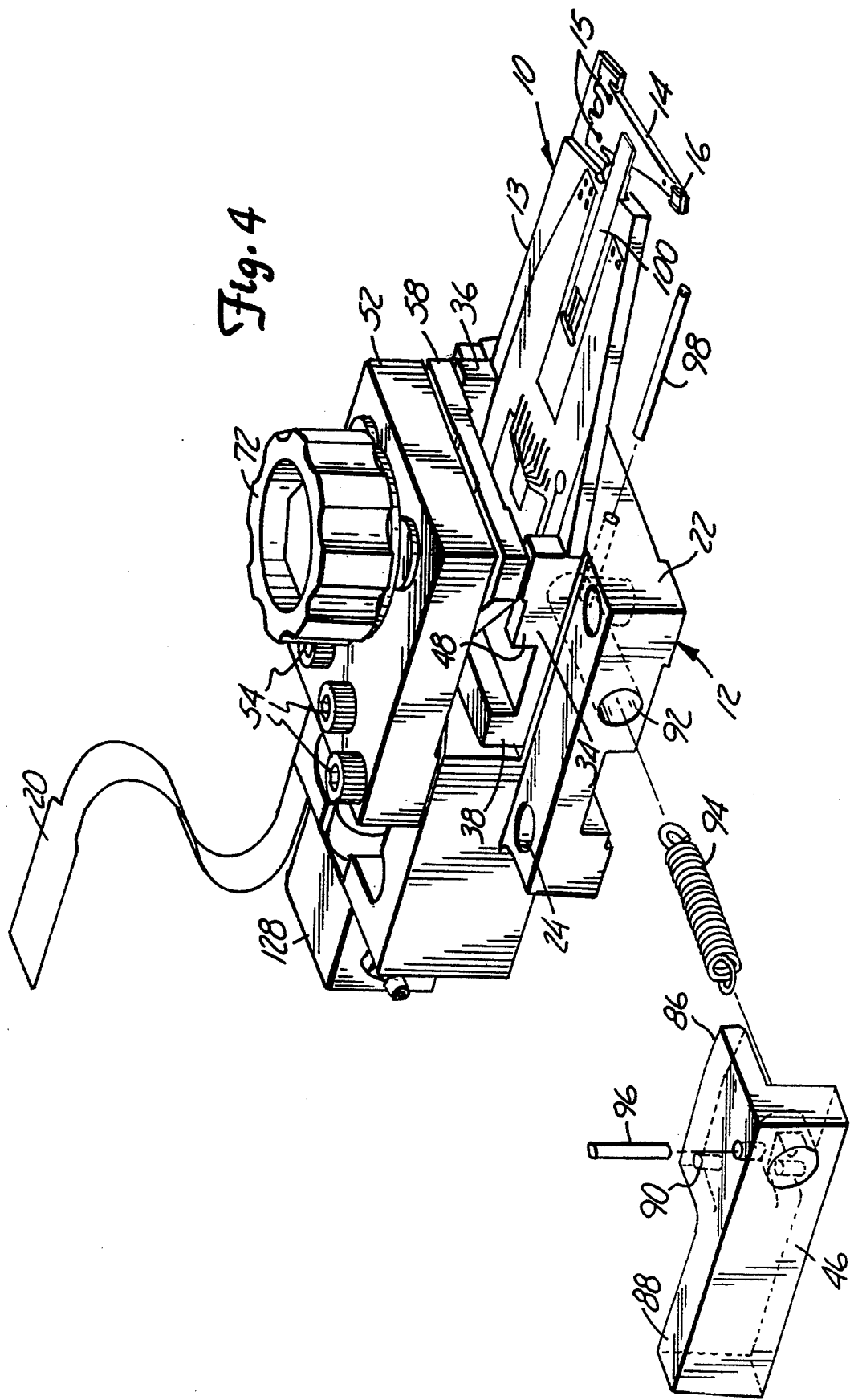
FIG. 4 is a perspective view of the receiver and head/arm assembly shown in FIG. 1, exploded horizontally.

As shown particularly in FIGS. 4 and 6, actuator 46 includes a cam surface 86 arranged to bear against surface 48 of shoulder 34 (FIG. 4). Lever arm 88 is mounted by pin 90 to base 22 for manual rotation on the axis of pin 90. Tension spring 94 extends through spring passage 92 in base 22 and is fastened at one end to pin 96 in lever 88 and at the other end to pin 98 in base 22. Tension spring 94 provides a constant design bias force against rigid arm 13 to hold the rigid arm in position against the positioning pins with the design force.

In its rest position cam surface 86 of mechanism 46 is biased by spring 94 against surface 48 of head/arm assembly 12. To release the head/arm assembly from the block, lever 88 is manually operated, thereby rotating the actuator about the axis of pin 90 to release the bias of the actuator against the head/arm assembly. Upon release of lever 88, spring 94 biases cam surface 86 against the head/arm assembly to cam shoulders 34, 36 and 38 of the head/arm assembly against pins 28, 30 and 32. Spring 94 biases the assembly into place.

FIGS. 5 and 6 illustrate a head lock assembly, comprising a lock arm 100 arranged to slide in receiver 102 in rigid arm 13. Lock arm 100, which may be constructed of suitable hard plastic, includes a blade 104 having a beveled forward edge 106 arranged to engage and cam flex arm 14 of the head/arm assembly. An enlarged body portion 108 (FIG. 6) is integral with blade 104 and is arranged to slide within recess 110 on one side of arm 13 (FIG. 6) between ends defined by enlarged openings 112 and 114. The bottom surface 116 of recess 110 supports body section 108. On the opposite side (FIG. 5), receiver 108 includes a recess 118 arranged to receive blade 104 of arm 100, recess 118 (which is approximately the same width as the width of blade 102) extending from enlarged porion 120 to the forward edge of arm 13. Recess 118 forms a slot (FIG. 6) with recess 110 between portions 112 and 114. Recess 118 has a surface 120 which engages a surface of blade 104 between portions 122 and 112 and between portion 114 and the forward edge of arm 13. As will be appreciated hereinafter, the opening of portion 112 and the slot formed by recesses 110 and 118 facilitate removal of the lock mechanism to permit disassembly of head/arm assembly 12.

One end of actuator rod 124 is fastened to actuator block 130 (FIG. 5), which in turn is mounted to air cylinder 128. Actuator rod 124 extends past the forward end of receiver 10 so that the other end of the actuator rod is fastened to lock arm 100 by pin 126. In the assembled condition, actuator rod 124 is received in slot 132 (FIG. 6) of arm 13. Lock arm 100 is arranged to selectively engage the flex arm 14 of the head/arm assembly. Thus, the forward beveled edge of arm 100 is arranged to engage flex arm 14 from the side to cam the flex arm and lift head 16 from the surface of the disc.

With the head disengaged from the lock mechanism, head 16 is free to fly over the rotating disc (not shown) or land thereon when the disc is stopped. To remove the head from the disc (such as when landed), air cylinder 128 is operated (such as by a pneumatic signal from the disc drive) to move rod 124 forward (to the right in FIG. 5) so that beveled edge 106 of blade 104 engages a side of flex arm 14 to urge the flex arm and head downwardly (into the paper of FIG. 5), thereby removing the head from the disc surface. Operating air cylinder 128 in the opposite mode retracts the blade (to the left in FIG. 5) to disengage from the flex arm to permit the head to return to an operable, unlocked position. One feature of the lock mechanism is that it may be operated when the head is at any radial position in relation to the disc, and not necessarily at a prescribed rest position.

To disassemble and reassemble head/arm assembly 12 to receiver 10, knob 72 is rotated to disengage springs 78 from biasing operator 58 against shoulders 34, 36 and 38 of rigid arm 13. Actuator 46 is manually operated to disengage the cam surface from the rigid arm. The head/arm assembly may then be manually removed from receiver slot 26. The head/arm assembly is disconnected from the lock arm by moving the head/arm assembly so that the rear edge 134 of the lock arm 100 clears the slot of enlarged portion 112, and blade 104 is removed through enlarged portion 112. To reassemble head/arm assembly 12 to receiver 10, the reverse of the previously described process is performed, forward edge 106 of blade 104 is inserted through enlarged portion 112 until the entire blade (other than the enlarged body portion) extends therethrough. Actuator 46 is operated to an open position and rigid arm 13 is received onto receiver surface 26 so that the shoulders of the rigid arm engage the locating pins 28, 30 and 32 as heretofore described. The actuator is released permitting the assemblage to be held in position, and the knob 74 is again tightened so that springs 78 bear against operator 58 to react against shoulders 34, 36 and 38, thereby clamping the head/arm into position.

One feature of the invention resides in the fact that the lock arm 100 is carried by the receiver assembly on the movable arm of the disc drive, rather than on the chassis. This permits raising and lowering the head regardless of the position of the head in relation to the disc and the chassis. Hence, the head may be removed from the disc at any radial position of the head.

Another feature of the invention resides in the fact that the receiver assembly according to the present invention may be employed with a stack of discs, and hence a stack of heads. In this respect, the shoulders 34, 36 and 38 of each head/arm assembly define the thickness of the head/arm assembly. By accurately sizing the shoulders in relation to the space between the respective discs of a disc pack or stack, several head/arm assemblies may be stacked in the one receiver assembly 10. The receiver would be modified with locator pins 28, 30 and 32 long enough to engage the respective edges of each head/arm assembly of the entire stack, surface 86 of the cam mechanism 46 would be large to engage the entire stack, and the mounting screws 54 would be long enough to support the entire stack. The operator mechanism and bias means need not be altered, as the operator mechanism would bear against the entire stack, thereby clamping all head/arm assemblies in position. In a stacked arrangement it might be desirable to either eliminate the lock assembly or provide separate lock assemblies 100 in connection with each head. The latter can be easily accomplished by attaching the separate actuator rods 124 of each lock assembly to actuator 130.

The present invention thus provides an effective receiver assembly to permit easy replacement and alignment of head/arm assemblies of a magnetic disc drive. The apparatus is particularly useful in connection with the servo heads of a disc drive which write and read servo data to and from the disc. The invention is effective in operation and requires minimal maintenance and adjustment. The receiver assembly in accordance with the present invention makes it possible to disassemble heads from a disc drive, such as for cleaning and/or replacement, and to reassemble heads to the disc drive without requiring extensive realignment.

Although the present invention has been described with reference to preferred embodiments, workers skilled in the art will recognize that changes may be made in form and detail without departing from the spirit and scope of the invention.

What is claimed is:

1. A lock mechanism for restraining a head of a head/arm assembly of a disc drive having a planar disc, the head/arm assembly having a rigid arm, flexible support means supporting the head and mounted to the rigid arm, the flexible support means normally biasing the head to an operating position with respect to the disc, the lock mechanism comprising:

a lock arm having a length, the lock arm supported by the rigid arm and arranged to move substantially parallel with the length of the lock arm and the plane of the disc between a first lock arm position wherein a forward edge of the lock arm engages the flexible support means to restrain the flexible support means from biasing the head to its operating position, and a second lock arm position wherein the forward edge of the lock arm is free of the flexible support means; and actuator means for moving the lock arm substantially parallel with the length of the lock arm and the plane of the disc between the first and second lock arm positions.

2. The lock mechanism of claim 1 and further including slot means in the rigid arm, the lock arm including means slidably supporting the lock arm to the slot means, and means attached to the actuator means for slidably moving the lock arm substantially parallel with the length of the lock arm and the plane of the disc between the first and second lock arm positions.

3. The lock mechanism of claim 1 wherein the flexible support means is mounted to the rigid arm so that the lock arm engages the flexible support means from a side thereof, the lock arm having a cam surface to cam the flexible support means to move the head from its operating position when the lock arm is moved substantially parallel with the length of the lock arm and the plane of the disc from the second to the first lock arm position.

* * * * *